(No Model.)
R. A. MORSE.
PASSENGER VEHICLE.
No. 380,812. Patented Apr. 10, 1888.
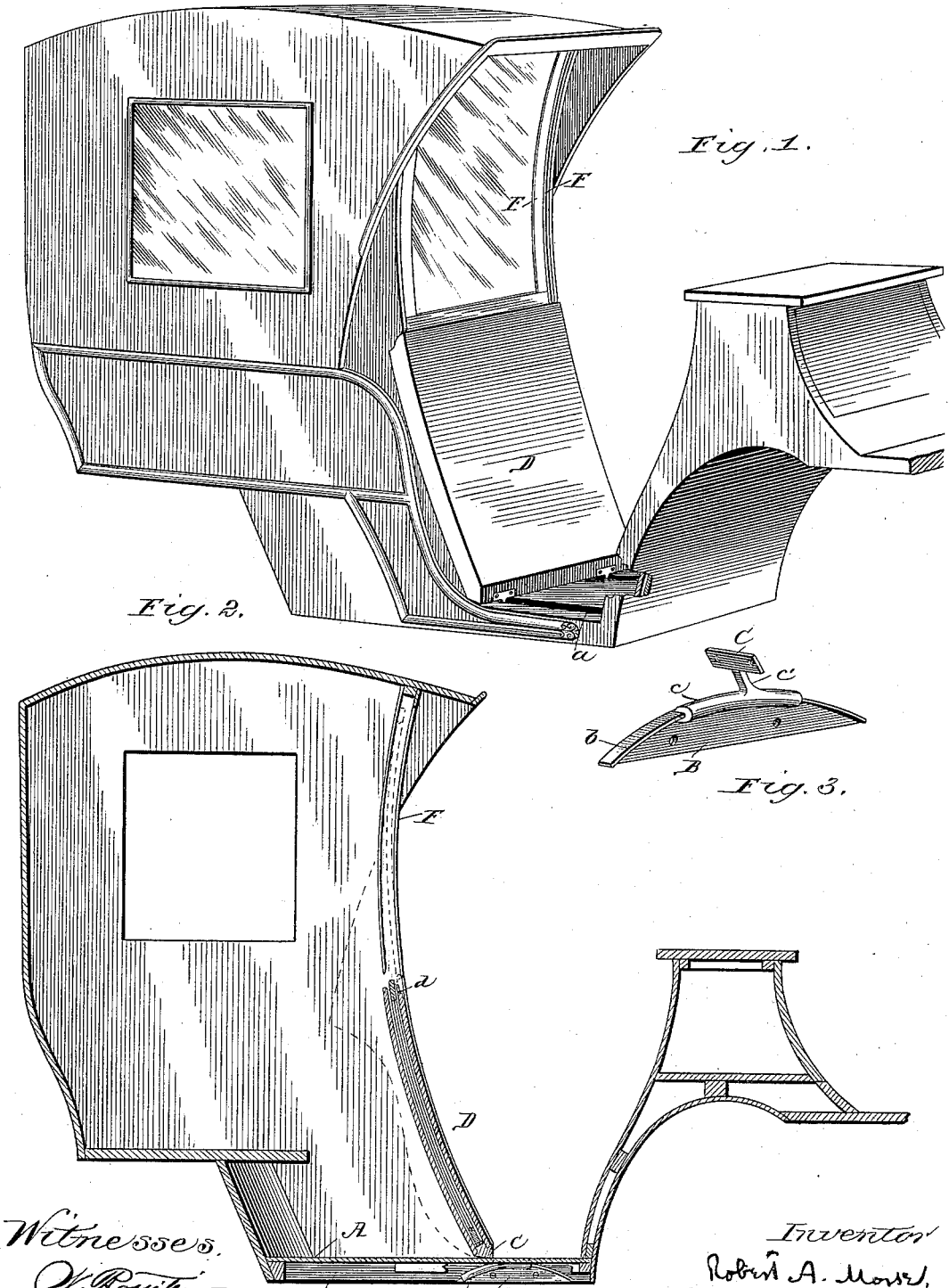

UNITED STATES PATENT OFFICE.

ROBERT A. MORSE, OF CHICAGO, ILLINOIS.

PASSENGER-VEHICLE.

SPECIFICATION forming part of Letters Patent No. 380,812, dated April 10, 1888.

Application filed December 19, 1887. Serial No. 258,370. (No model.)

*To all whom it may concern:*

Be it known that I, ROBERT A. MORSE, a citizen of the United States, residing at Chicago, in the county of Cook, State of Illinois, have invented certain new and useful Improvements in Passenger-Vehicles, of which I do declare the following to be a full, clear, and exact description, reference being had to the accompanying drawings, forming part of this specification.

My present invention has relation more particularly to that class of vehicles—such, for example, as are now commonly known as "Victoria hansom-cabs"—in which the open front of the vehicle is provided with a door adapted to be moved in forward direction in order to permit the entrance or egress of the passengers. In this class of devices it has been heretofore proposed to provide the vehicle with a front door connected to the body by means of rods that extended through slots in the floor and were hinged to brackets depending at a distance beneath the floor. This construction, however, while possessing advantages, is somewhat objectionable, for the reason that the depending brackets and hinged rods are unsightly, increase the weight of the vehicle, and are liable to become loosened by the rough usage of the cab. In this class of vehicles it has been also customary to form the front door of ogee shape, and to provide for the window that closes the space above the door guideways extending beneath the roof of the vehicle, so that when the window was not in use it could be raised and pushed backward beneath the roof. This arrangement of window is defective, for the reason that it mars the appearance of the interior of the vehicle, is apt to be noisy, and necessitates considerable trouble upon the part of the passenger or driver to operate the same.

My present invention has for its object to obviate the difficulties above mentioned; and to this end it consists, first, in connecting the front door with the body of the vehicle in such manner that the bottom of the door can slide freely in outward direction; and, secondly, it consists in forming the front door of curved shape in vertical direction, and providing a correspondingly-curved window adapted to slide within said door and within suitable guides.

In the accompanying drawings, Figure 1 is a perspective view of a vehicle-body having my improvements applied thereto. Fig. 2 is a view in central longitudinal section through the vehicle-body. Fig. 3 is an enlarged detail view illustrating the preferred form of guides and shoes for connecting the bottom of the door to the floor of the vehicle-body.

A designates the floor of the vehicle-body, within which are formed the slots $a$, and to the side sills, $a'$, of which are attached the guides B, one of such guides being attached to each sill at a point adjacent the slot $a$ of the floor. The guides B are formed with the ribs or rails $b$, preferably curved, over which fit the corresponding shoes $c$ of the standards C, the contracted portions $c'$ of which extend through the slot $a$ of the floor, and the upper ends of which are bolted to the bottom of the door D of the vehicle. By thus connecting the front door with the floor of the vehicle-body it will be seen that the necessity for hinges or brackets for sustaining the body of the door is avoided, and at the same time, when the door is to be opened, it can be moved bodily in outward direction in such manner as to allow ample space for the egress or entrance of the passenger.

In the forward or backward movement of the door the shoes C will slide upon the guides B, and by reason of the curvature of these guides the door will be retained either in its open or closed position against danger of accidental displacement.

In carrying out the second part of my invention I form the door D of curved shape in vertical direction, and separate the walls of this door in such manner as to form a space wherein will slide a correspondingly-curved window, E, the upper edge of the door being preferably provided with a ledge, $d$, of well-known construction, whereon the bottom of the window can rest when in elevated position. Upon the inside of the cab-body are preferably formed the guides F, curved to correspond with and receive the frame of the window E, so that it will be seen that when the door D is in closed position, as shown in Fig. 1, the front of the vehicle can be completely closed by raising the window E from the door into the curved guides F adapted to receive it. By thus forming the front door of the vehicle with a curvature in vertical direction, and by forming the window of correspondingly-curved shape, I secure an effective means of closing the front of the vehicle and enable the window to be readily manipulated and concealed when not in use.

If desired, the shoes C may be provided with small friction-rollers, to enable them to slide more easily upon the guides, although I have found in practice that such rollers are not necessary.

It will be readily understood that the details of construction above set out may be varied without departing from the scope of my invention, and that the invention can be applied to other forms of vehicles than that illustrated in the drawings.

Having thus described my invention, what I claim as new, and desire to secure by Letters Patent, is—

1. In a passenger-vehicle, the combination, with the body, of a front door having its bottom connected with the body in a manner free to slide in outward direction, substantially as described.

2. In a passenger-vehicle, the combination, with the body, of curved guideways, and a door the bottom whereof is movably mounted upon said curved guideways, substantially as described.

3. In a passenger-vehicle, the combination, with the body having slots in its floor, of the guideways B and the door provided with the shoes C, substantially as described.

4. In a passenger-vehicle, the combination, with the body having an open front, of a front door curved in vertical direction, a correspondingly-curved window to slide within said door, and suitable guides for said window, substantially as described.

ROBERT A. MORSE.

Witnesses:
JAMES H. PEIRCE,
J. B. CARPENTER.